United States Patent [19]

Copeland

[11] 4,047,962

[45] * Sept. 13, 1977

[54] CONSTRUCTION COMPOSITION

[75] Inventor: William Leo Copeland, Shreveport, La.

[73] Assignee: Copeland Concrete Products, Inc., Monroe, La.

[*] Notice: The portion of the term of this patent subsequent to Aug. 6, 1991, has been disclaimed.

[21] Appl. No.: 474,100

[22] Filed: May 28, 1974

Related U.S. Application Data

[63] Continuation-in-part of Ser. No. 238,659, March 27, 1972, Pat. No. 3,827,895.

[51] Int. Cl.$^2$ .............................................. C04B 7/02
[52] U.S. Cl. ............................... 106/90; 106/93; 106/98; 106/99; 106/109; 106/110; 106/111; 106/115; 106/315; 106/DIG. 1
[58] Field of Search .................. 106/98, 99, 115, 90, 106/93, 109, 110, 111, 315, DIG. 1

[56] References Cited

U.S. PATENT DOCUMENTS

| | | | |
|---|---|---|---|
| 493,152 | 3/1893 | Culver | 106/115 |
| 662,643 | 11/1900 | Griswold | 106/99 |
| 767,434 | 8/1904 | Perkins | 106/99 |
| 1,961,525 | 6/1934 | Offutt | 106/99 |
| 3,093,505 | 6/1963 | Conway | 106/99 |
| 3,438,853 | 4/1959 | Haines, Jr. et al. | 106/93 |
| 3,565,648 | 2/1971 | Mori et al. | 106/89 |
| 3,622,361 | 11/1971 | Denis et al. | 106/93 |
| 3,827,895 | 8/1974 | Copeland | 106/99 |

OTHER PUBLICATIONS

Agricultural Research USDA publication, July 1969.
Modern Plastics, Apr. 1965, pp. 156 to 159.
"Concrete Technology," vol. 1, D. F. Orchard, John Wiley & Sons, 1958, p. 66.
"The Condensed Chemical Dictionary," Van Nostrand Reinhold Co., N.Y., 8th ed., 1971, p. 772.

*Primary Examiner*—Patrick P. Garvin
*Assistant Examiner*—John P. Sheehan
*Attorney, Agent, or Firm*—John M. Harrison

[57] ABSTRACT

A construction composition developed to provide a material of construction which can be utilized to build essentially all types of structures, including houses, office buildings, and the like, which composition is capable of being wet mixed and subsequently molded into convenient and useful shapes. The composition has great strength, excellent shrink resistance properties, is highly shock resistant, provides good insulation for structures, and is adapted for use with suitable molds to form the entire wall structure of a house or other building in a single pouring.

10 Claims, No Drawings

CONSTRUCTION COMPOSITION

CROSS-REFERENCE TO RELATED APPLICATIONS

This application is a continuation-in-part of copending application Ser. No. 238,659, filed Mar. 27, 1972 now U.S. Pat. No. 3,827,895.

BACKGROUND OF THE INVENTION

Field of the Invention

This invention relates to a new composition for use in building structures, and more particularly, to a new composition which may be poured as a liquid and when allowed to cure, combines the features of strength, shock resistance, insulation, and waterproofing qualities in a single material. The material can be easily formed into substantially any desired shape and thickness depending upon the forms utilized.

Description of the Prior Art

Conventional building techniques may be typified by the construction of a conventional home, office building, or other structure, in which the following sequence is used: The lot or ground area upon which the structure is to be constructed must first be graded and the slab poured after footings are dug and forms set. Among the skilled labor needed in setting the slab are carpenters for setting the forms, roofers to handle waterproofing of the slab, iron workers to tie in reinforcing steel and lay wire mesh, plumbers, whose function is to install necessary piping and fixtures, and cement finishers to place and finish the concrete. After pouring the slab, carpenters must again be utilized to strip the forms and laborers must be directed to move the necessary material and clean excess debris from the lot. Carpenters are then again required to frame the house, electricians must be used to wire it, and a crew of insulators utilized to apply sheeting and to insulate the interior walls. Roofers must then be directed to apply the roofing, and yet another crew to apply the sheet rock. Painters must then tape, float and paint the structure interior, tile men must be available to install the floors, and carpenters directed to place the cabinets and formica. Next, the bricklayers must brick the exterior of the structure and the operating engineer must return to grade the lot to final specifications.

From a consideration of the above simplified illustration, it is obvious that current construction techniques involve the use of many skilled crafts, which, in combination with high material cost, effects a high cost of construction which must be passed on to the owner of the home or other structure being built. Furthermore, studies conclusively show that the cost of construction has increased each year from year to year, and is likely to continue doing so for the foreseeable future.

Alternative materials of construction designed to reduce costs may be exemplified by use of concrete blocks in erecting structures, but this material is subject to severe limitations, chief among which are poor appearance, lack of sufficient insulating properties, and the expense of providing necessary strength. Nor does the addition of brick to provide the necessary structural strength and a pleasing appearance solve the problem, since a brick wall having comparable strength must be built to a minimum thickness of eight inches, and requires the services of a bricklayer to construct, thereby again increasing construction costs.

While it has long been known that conventional structural and structural lightweight concretes may be utilized as construction materials, these materials have been found to be unsatisfactory as a poured-in-place, all inclusive material of construction since the cost is so great and the materials are subject to severe limitations regarding such necessary qualities as insulation and shock resistance. Furthermore, the cost of precast panels built of these materials is generally prohibitive because of high transportation and erection costs.

SUMMARY OF THE INVENTION

Accordingly, it is a purpose of this invention to provide a composition of matter which may be used to form the structure, which composition has the necessary density, durability, and strength for functional use. The composition may be readily poured into any suitable mold, may be easily nailed, sawed and drilled, and is readily formed to provide a simulated brick or other outer structure having a pleasing appearance, and simulated sheetrock or other desired interior structure. The composition is also fireproof, waterproof, vermin resistant, rot proof, wind resistant, erosion proof and storm proof, and is characterized by high shock resistance and good insulating properties. In a typical embodiment of the invention, the composition may function as a single wall material of construction having the above-noted characteristics with the exterior walls having the same appearance as ordinary brick, and the interior walls simulating textured gypsum board. The forms utilized to cast this material have been specially designed for fast, efficient erection, and are equipped with bracing, which effect an absolutely straight and true surface with desired ornamentation on both the exterior and interior wall. The composition has proved to be relatively inexpensive since it has been found that a savings of up to one-third of conventional material and labor costs may be realized in the wall construction phase alone by application of this invention.

It has been found that the following basic ingredients may be combined to provide a composition having the characteristics heretofore noted: Water, to make the composition fluid; gypsum, for structural strength; an expanded material, such as expanded ore, to fill and insulate; cement, for strength; wood fibers, to impart shock resistance; and a fibrous material such as sisal, polypropylene, or fiberglass fibers, to add shock resistance. Additional preferred ingredients which may be added to aid shrink resistance, minimize porosity and retard excessively rapid setting, are an alkaline earth metal halide such as calcium chloride; fly ash, silica powder, volcanic rock powder or limestone; and an acid salt, organic acid salt, or an alkali metal or alkaline earth metal organic acid salt such as sodium or potassium citrate, respectively.

DESCRIPTION OF THE PREFERRED EMBODIMENTS

It will be recognized that the materials used in the composition of this invention can be prepared in varying proportions to provide compositions suitable for various environmental conditions according to the teachings of this invention. For example, the gypsum material is utilized in the composition along with cement, and preferably Portland cement, which is a high quality cement composition, to provide the necessary structural strength. Both the cement and the gypsum are preferably mixed in powder form in the composition in the range of from about 15% to about 40% by volume each.

An expanded material produced from heated ores, or clays or chemically expanded, such as expanded mica, known in the art as "vermiculite" and marketed under the tradename "Zonolite", by W. R. Grace Company, is also preferably added to the composition in the proportion of from about 9% to about 29% by volume. Other expanded ore materials, such as volcanic rock and pumice aggregate, and including the expanded hydrosilicate ores exemplified by that known in the art as "pearlite," all of which carry captive water which effects exfoliation of the material lamina upon heating, may also be used. Additional expanded materials which may be utilized in the invention to insulate and act as a filler in the composition are expanded clays such as expanded hadide, produced by heating moisture-containing clays until the material "bloats" and sinters. The expanded product is then ground to suitable sizes for use. Other materials suitable for use in the composition are chemically expanded materials, such as expanded styrene and polystyrene beads, and like compositions, which are "puffed" and cause air to be trapped in the bead structure. These materials are preferably added to the commposition mixture as expanded granules which are relatively soft and are of average size sufficient to pass a 20 mesh screen. The granules generally maintain their original size and shape after curing of the composition, and also retain moisture, which aids in setting of the cement ingredient and eliminates any necessity for special curing of the composition. The granules also serve to provide good insulation, fireproofing and shock resistant qualities to the finished composition.

A fibrous material, such as wood, asbestos or sugar cane fibers may be added to the composition in a volume percentage range of from about 8% to about 28%, in order to aid moisture retention and flexural strength of the composition. The fibers, which may be added in the form of sawdust or chips not exceeding about seven-eighths of an inch in diameter, also serve to provide reinforcement and shock resistance in the composition, for particular use in earthquake prone areas such as California, where such resistance may be necessary. In the latter case, where high shock resistance is desired, other fibrous materials such as sisal, nylon, fiberglass, polypropylene, polyethylene (or other similar polymerized compound) fibers may be used in the composition.

An alkali metal halide or alkaline earth metal halide such as calcium chloride or potassium chloride may also be added to the mixture as desired, preferably in the volume percentage range of from about 0.25% to about 1%, in order to induce rapid setting of the composition, limit shrinkage, and to increase the strength of the composition as it sets. It should be pointed out that under circumstances where such a material is used in the composition, it is generally preferred not to use an amount greater than 1% by volume because such an excess tends to cause an excessively rapid setting of the composition mixture, and frequently inhibits proper forming of the mixture as it is poured. However, under certain conditions where it is desired to effect a fast setting of the building material composition, larger percentages of the alkaline earth metal halide, and preferably, calcium chloride, may be used. Fly ash may also be selectively utilized in the composition to enhance waterproofing characteristics, and this ingredient is preferably added as a powder in a volume percentage of from about 5% to about 10%. It has been found that particulate fly ash or, in the altenative, limestone dust, will act as a filling agent to fill the porous structure of the composition and to provide the necessary waterproofing qualities. A fibrous material such as sisal, nylon, polyester, polyamide, polypropylene or fiberglass, is also preferably utilized in the composition as a reinforcing agent to compliment the gypsum and cement, and is preferably added as fibers having a length of from about one inch to about three inches, in a volume percentage range of from about 1% to about 2%. Preferred among these are polypropylene, sisal and fiberglass fibers, and if fiberglass fibers are utilized in the composition, the fibers should be suitably treated prior to introduction into the composition in order to prevent fiber decomposition due to action of the calcium chloride and cement ingredients in the formulation. Water is then added to the mixture in the proportion of about 3.5 gallons per cubic foot of mixture to provide the necessary fluidity. It will be appreciated that the concentration of water in the composition is not critical, it being necessary only to provide the necessary fluidity to effectuate pumping or otherwise facilitating entry of the composition mixture into the forms.

It will be recognized that different types and grades of materials noted above, such as gypsum, used for plasterboard, for example, may be utilized in the composition. Preferred among the mineral $CaSO_4.2H_2O$ which may be used are those gypsum compositions having the tradenames "Hydrostone," manufactured by U.S. Gypsum Company, and "Densacal Plaster", manufactured by Georgia Pacific Company, both products of which relate to high density $CaSO_4.2H_2O$, or gypsum. Ordinary gypsum may be utilized in the invention, but the above high density compositions are preferred due to the high strength of these products.

The expanded material ingredient in the formulation is preferably selected from the group of micaceous minerals, hydrous silicates or mixtures of these, such as the ore composition generally known in the trade or industry as "pearlite," and particularly, those derived from alteration of mica, such as the composition generally known in the trade as "vermiculite," heretofore mentioned, the granules of which expand at high temperature to yield a lightweight, highly water absorbent material. If desired, the expanded material may be substituted for wood fibers or other fibrous material in the composition, with the expanded granules added in the same proportion as the fibrous material. Under these circumstances, the expanded ingredient ore may also be used as a primary ingredient. Furthermore, the fly ash may be substantially any combustible ash which is a by-product of a combustible fuel, and the fibrous material, preferably sisal or polypropylene should be introduced as small diameter cordage of short nap length, or, in the case of polypropylene, small diameter particles of short length, (preferably two inches), which will easily blend into the composition mixture.

Since the alkaline earth metal halide and alkali metal organic acids, such as calcium chloride and sodium citrate, respectively, have an opposite effect on the setting time of the composition mixture, the former causing rapid setting and the latter retarding setting time, these ingredients are normally not used together in the composition. Under circumstances where rapid setting of the formulation is desired, an alkaline earth metal halide, and preferably calcium chloride, may be added in a volume percentage of up to about one percent. Such addition results in a setting time of approximately four times less than the time required for the composition to set without the addition of calcium chloride. For example, if the composition normally sets in about twenty minutes, the addition of about one percent by volume of calcium chloride effects a setting time of about five minutes. Variations between these extremes may, of course, be achieved by varying the about of calcium chloride in the mixture.

In contrast, under circumstances where it is desired to delay the composition setting time to insure elimination of "cold" joints and other mechanical problems accompanying rapid setting, an alkali metal organic acid, and preferably sodium citrate, can be added to the formulation in proportions up to about 1.5 percent by volume. Addition of such a concentration of sodium citrate extends the composition setting time from a normal time of about twenty minutes to a retarded setting time of about sixty minutes.

In a preferred embodiment of this invention, gypsum is present in the composition in a volume percentage of from about 15% to about 40%; the expanded material is present in a volume percentage of from about 9% to about 29%; the cement is introduced in a volume percentage of from about 15% to about 40%; and polypropylene, fiberglass or sisal fibers are used in a volume percentage of from about 1% to about 2%.

In yet another preferred embodiment of the invention, under construction circumstances which dictate a normal composition setting time of about twenty minutes, the formulation of this invention is composed of the following ingredients in the following volumetric proportions:
 Gypsum; 21%
 Expanded Ore; 28%
 Portland Cement; 21%
 Wood Fibers; 21%
 Limestone Dust or Fly Ash; 7%
 Sisal or polypropylene Fibers; 2%
 Water –3-4 gallons per cubic foot of mixture.

In a more preferred embodiment of the invention, under construction circumstances which dictate an accelerated setting time, the formulation of this invention is composed of the following ingredients in the following volumetric proportions:
 Gypsum; 21%
 Vermiculite; 28%
 Portland Cement; 21%
 Wood Fibers; 21%
 Calcium Chloride; 1%
 Limestone Dust or Fly Ash; 7%
 Sisal or Polyprophylene Fibers; 1%
 Water –3.5 gallons per cubic foot of mixture.

In yet another more preferred embodiment of the invention wherein the composition set forth immediately above is utilized, the wood fibers are replaced by vermiculite in the same proportions as the wood fibers.

In a most preferred embodiment of the invention, the construction composition of this invention is composed of the following ingredients in the following volumetric proportions to effect optimum setting and curing conditions:
 Gypsum; 21%
 Vermiculite; 28%
 Portland Cement; 21%
 Wood Fibers; 21%
 Sodium Citrate; 1%
 Limestone Dust or Fly Ash; 7%
 Sisal or Polypropylene Fibers; 1%

The invention will be better understood by a consideration of the following examples:

EXAMPLE I

Six cubic feet of gypsum, six cubic feet of Portland cement, 2 cubic feet of limestone dust, 8 cubic feet of vermiculite, one-half of a cubic foot of polypropylene fibers, one-half of a cubic foot of calcium chloride, and 6 cubic feet of dry shredded wood fibers were placed in a mixing container, and into this mixture was added 92 gallons of water. The composition was stirred to a uniform consistency and was noted to be viscous. The mixture was then poured into several forms, each in the shape of a cylinder having a diameter of approximately 6 inches and a height of about 12 inches, for testing and was allowed to stand for 28 days to cure (setting of the mixture was observed to occur in about 15 minutes). After the curing period, a specimen, which was observed to be a greyish brown in color, was broken under ASTM compressive testing conditions. The density of the mix was found to be ninety-one pounds per cubic food on a wet basis, and 68 pounds per cubic on a dry basis. The compressive strength of this and other samples computed as a function of time was found to be as follows:
 2 hours – 250 psi
 7 days – 650 psi
 28 days – 1,000 psi

EXAMPLE II

A composition mixture having the same ingredients in the same proportions as set forth in Example I, except for substitution of sodium citrate for the sodium citrate, was mixed and poured into the forms described in Example I for testing. Setting time was observed to be 1 hour, and the composition was allowed to cure for 28 days. The results of compressive testing and density measurements were essentially the same as those set forth in Example I.

EXAMPLE III

A sample of the product having the composition set forth in Example I was immersed in water for 48 hours, wiped dry, weighed, placed in an oven and heated at 230° F for 48 hours. The sample was then cooled in a sealed chamber, weighed, and the drying and cooling cycle repeated for an additional 48 hour period. The gravimetric results were as follows:

| Initial Wt. (lbs.) | Wt. after 48 hrs. sat (lbs.) | Wt. after Initial drying (lbs.) | Linear Shrinkage (%) |
|---|---|---|---|
| 5.27 | 5.87 | 4.05 | 0.0381 |

EXAMPLE IV

Five samples of the product having the composition set forth in Example I and measuring 3 × 3 × 12 were subjected to a test for flexural strength in accordance with ASTM standards, Federal Specification SS-B-663, which strength as a function of load was found to be as follows:

| Test No. | Total Load (lbs.) | Flexural Strength (psi) |
|---|---|---|
| 1 | 850 | 330.5 |

-continued

| Test No. | Total Load (lbs.) | Flexural Strength (psi) |
|---|---|---|
| 2 | 550 | 213.8 |
| 3 | 700 | 272.2 |
| 4 | 800 | 311.2 |
| 5 | 900 | 350.1 |

EXAMPLE V

A sample of the product having the composition set forth in Example I was subjected to successive water immersion, freezing and thawing conditions as follows: The sample was first weighed, then immersed in water for 8 hours, removed, and again weighed. It was then placed in a −35° F chamber and frozen for 8 hours, removed, and placed in an oven and heated at 350° F for 8 hours, after which it was removed and again weighed. The results were as follows:

| Initial Wt. (lbs.) | Wt. after 8 hrs. sat (lbs.) | Wt. after 8 hrs. (lbs.) | Dry Wt. freezing & thawing cycles | No. Adverse Affects |
|---|---|---|---|---|
| 5.25 | 5.80 | 4.0 | 90 | None |

EXAMPLE VI

Six samples of the product having the composition set forth in Example I were cured for 28 days and subjected to a splitting tensile strength test by application of ASTM test number C 496-69, and the results were as follows:

| Cylinder No. | Maximum Load (Pounds) | Splitting Tensile Strength (PSI) |
|---|---|---|
| 9W | 9,500 | 84 |
| 9X | 11,000 | 97 |
| 9Y | 10,500 | 93 |
| 9Z | 13,500 | 119 |
| 9Z1 | 11,000 | 97 |
| 9Z2 | 11,500 | 102 |
| | Average: | 99 |

EXAMPLE VII

Five samples of the product having the composition set forth in Example I and measuring 3 × 3 × 12 were cured, placed in water for 48 hours, wiped dry and weighed, placed in an oven at 230° F for 48 hours, cooled in sealed chambers, and measured. The drying and cooling cycle was then repeated for an additional 48 hours, and the results were as follows:

| Specimen Number | Wt. as received(lbs) | Wt. after 48 hours Saturation | After wt. (lbs) | 72 hrs. Linear 1st/side | drying Shrinkage 2nd/side | %, Average |
|---|---|---|---|---|---|---|
| 1 | 5.38 | 6.04 | 4.23 | 0.0395 | 0.0410 | 0.0403 |
| 2 | 5.23 | 5.86 | 4.01 | 0.0376 | 0.0404 | 0.0404 |
| 3 | 5.57 | 6.07 | 3.99 | 0.0363 | 0.0431 | 0.0358 |
| 4 | 5.56 | 5.92 | 4.13 | 0.0380 | 0.0353 | 0.0382 |
| 5 | 5.02 | 5.84 | 4.02 | 0.0386 | 0.0384 | 0.0384 |
| | | | Average: | | 0.0386 | |

EXAMPLE VIII

A cured wall section formed of the composition product set forth in Example I and having dimensions of 6 × 6 × 4 was set up for application of a seven day simulated environmental test. Raining conditions were simulated by use of water hoses with spray nozzles and wind effect was simulated by use of a hydraulic jack positioned horizontally against the wall section. Water was continuously applied to the wall section for seven days and a horizontal load of 625 PSF was continuously applied over the test period by use of the jack. The 625 PSF was measured by use of a 10,000 pound capacity Marshall Proving Ring, No. 1181, and the deflection of the wall was checked with a 0.001 inch dial indicator. At the end of the seven day test period the horizontal load was steadily increased to determine at what point the wall would fall. The results of this load application were as follows:

Total load applied for seven days – 625 PSF
Total deflection over test period – 0.0017 inches
Total load required to cause failure – 2,100 PSF

EXAMPLE IX

A cured roof section measuring 15.7 × 11.7 × 6 and formed of the composition set forth in Example I was set up for testing and a total load of 38,170 pounds (207 PSF) applied. There was no visible failure of the roof section upon application of the load, and it was removed.

While it will be recognized that the composition of this invention may be introduced into forms designed to produce a selected product by a variety of techniques, it is preferred a pump the mixture into the forms. This procedure insures that the forms are uniformly filled, and effects a continuous and uninterrupted flow to avoid "cold" joints in the composition as it hardens; after a firm set has been achieved the forms are removed. Curing of the composition is effected by allowing the mixture to set for a specified period of time. Under ordinary circumstances, the composition setting time prior to removal of the forms should not exceed about two hours. As heretofore noted, depending upon the particulardesign of the forms utilized, the outside of the structure may be formed to simulate a brick or concrete surface, and the inside can be designed to resemble textured gypsum, which may be easily pained or otherwise decorated for finishing purposes. Other materials may be simulated as desired, depending upon the form design, and use of the monolithic pour technique vastly reduces the chance of overturning and collapse under load. The material may be mill mixed to exact specifications with strict quality control, requiring only the addition of water at the job site with no special plant or equipment needed, to effect the desired composition. Furthermore, the capability for producing a wall or structure having particular specifications is limited only by the availability of the proper forms, an appropriate mixer, and equipment to pump the mix to the forms.

It is significant that under circumstances where additional insulating properties are required, either the wall or other structural member thickness may be increased, the density of the mix reduced, or particular ingredients, such as wood fibers and vermiculite or other expanded material may be added in increased quantities. Furthermore, the durability and permanency of the composition structure is essentially that of conventional concrete, and maintenance on such surfaces as the interior wall is limited only to that which would normally be required in conventional structures, such as painting, paneling, wallpapering and/or texturing. Since the wall and other structural parts are solid, the necessity of replacing torn and broken sheetrock as in conventional housing is eliminated, and the walls are capable of being nailed for installation of paneling, if desired. Furthermore, trim, molding, and accessories may be installed and adhesives applied for hanging wallpaper, as in conventional structures.

In addition to the superior qualities characteristic of the composition enumerated above, it is further significant that pouring of the product composition of this invention and the product itself is unaffected by wide temperature variation, since the composition will not freeze when poured in subzero temperatures due to the heat of hydration generated in the setting material. So long as the water can be added before it freezes, the mixture will not be adversely affected by either low or high temperatures, and it can be poured when outside temperatures are as low as −20° fahrenheit. Furthermore, the pouring technique itself, as well as the composition mixture, is unaffected by hot and cold weather, freezing and thawing conditions, as well as varying humidity and other adverse weather conditions.

It is also significant that the composition of this invention may be readily adapted for use in any part of the United States as a material of construction due to its versatility. For example, it may be designed to withstand earthquake shocks prevalent on the West Coast, by incorporating a high flexure strength made possible by addition of higher concentrations of the wood fiber and sisal or polypropylene ingredients. The product may be made resistant to wind and ice storms by incorporating higher concentrations of cement and fly ash, for example, to enhance strength and water-impermeable characteristics, and the composition is impervious to the adverse affects of salty air found in coastal areas.

Other advantages of the composition of this invention are found in the features of seal-reinforcement, which eliminates the need for steel reinforcement necessary in conventional concrete structures, and the capability of mill mixing to exact specifications, which produces a mixture requiring only the addition of water and mixing to ready the composition for pouring. As heretofore noted, the composition is also characterized by a controlled curing period after which the forms may be removed, and is shrink resistant, a feature which eliminates cracking and checking in the finished product and enables the forming of selected fine detail in both the interior and exterior surfaces. The composition has an average flexural strength of about 340 psi, which compares to approximately 100 psi for conventional concrete, and is essentially completely inert, as heretofore note. The poured wall is also characterized by low density, a factor which produces excellent noise reduction qualities.

It will be appreciated by those skilled in the art that while it is preferred to use a waterproofing agent such as fly ash or limestone dust in the composition, waterproofing of the finished product can be alternatively effected by conventional techniques known in the art. For example, the composition product can be formed and cured without using a waterproofing agent mixed therein, and can be water and weatherproofed by application of a conventional mastic or spray after curing.

Having described my invention with the particularity set forth above, what is claimed is:

1. A composition, which upon mixing with water and subsequent setting forms a material of construction, consisting essentially of:
   a. gypsum in a volume percentage of from about 15% to about 40%;
   b. an expanded material in a volume percentage of from about 9% to about 29%;
   c. cement in a volume percentage of from about 15% to about 40%; and
   d. polypropylene or fiberglass or sisal fibers in a volume percentage of from about 1% to about 2%.

2. The composition of claim 1 further including fly ash or limestone dust in a volume percentage of from about 5% to about 10%.

3. The composition of claim 1 wherein said expanded material is an expanded ore.

4. The composition of claim 1 wherein said expanded material is an expanded ore and further including fly ash or limestone dust in a volume percentage of from about 5% to about 10%.

5. The composition of claim 4 wherein said expanded ore is vermiculite or pearlite.

6. A composition, which upon mixing with water and subsequent setting forms a material of construction, consisting essentially of gypsum, in a volume percentage of from about 15% to about 40%, vermiculite or pearlite in a volume percentage of from about 9% to about 29%, Portland cement, in a volume percentage of from about 15% to about 40%, polypropylene or sisal or fiberglass fibers, in a volume percentage of from about 1% to about 2%, limestone dust or fly ash, in a volume percentage of from about 5% to about 10%, wood asbestos, or sugar dane fibers in a volume percentage of from about 8% to about 28% and sodium citrate in a volume percentage of from about 0.5% to about 1.5%.

7. The composition of claim 1 further including calcium chloride.

8. The composition of claim 1 further including sodium citrate.

9. A composition, which upon mixing with water and subsequent setting forms a material of construction, consisting essentially of gypsum, in a volume percentage of about 21%; vermiculite or pearlite, in a volume percentage of about 28%; Portland cement in a volume percentage of about 21; wood fibers in a volume percentage of about 21%; fly ash or limestone dust in a volume percentage of about 7%; polypropylene or sisal or fiberglass fibers in a volume percentage of about 1%; and sodium citrate in a volume percentage of about 1%.

10. The composition of claim 6 wherein sodium citrate is present in said composition in a volume percentage of about 1%.

* * * * *